(12) United States Patent
Trautner et al.

(10) Patent No.: US 7,465,328 B2
(45) Date of Patent: Dec. 16, 2008

(54) DUST COLLECTOR FOR A POWER TOOL

(75) Inventors: Paul K. Trautner, Baltimore, MD (US); Philip T. Miller, Phoenix, MD (US)

(73) Assignee: Black & Decker Inc., Newark, DE (US)

( * ) Notice: Subject to any disclaimer, the term of this patent is extended or adjusted under 35 U.S.C. 154(b) by 437 days.

(21) Appl. No.: 11/187,760

(22) Filed: Jul. 22, 2005

(65) Prior Publication Data

US 2007/0017191 A1   Jan. 25, 2007

(51) Int. Cl.
*B27B 5/29* (2006.01)
(52) U.S. Cl. .......................... 55/385.1; 55/302; 55/498; 451/451; 451/456; 451/453; 451/87; 451/88; 451/270; 451/354; 451/357; 173/71; 173/73
(58) Field of Classification Search ................ 55/385.1, 55/302, 498; 451/451, 456, 453, 87, 88, 451/270, 354, 357; 173/71, 73
See application file for complete search history.

(56) References Cited

U.S. PATENT DOCUMENTS

| | | | |
|---|---|---|---|
| 2,617,186 A | 11/1952 | Pickles | |
| 2,627,657 A | 2/1953 | Etchen | |
| 3,585,980 A | 6/1971 | Mellor | |
| 3,824,689 A | 7/1974 | Hutchins | |
| 4,022,182 A | 5/1977 | Lenkevich | |
| 4,192,104 A | 3/1980 | Patenaude | |
| 4,343,115 A | 8/1982 | Stabler et al. | |
| 4,577,526 A | 3/1986 | Stabler | |
| 5,033,192 A | 7/1991 | Franz et al. | |
| 5,537,748 A | 7/1996 | Takahashi et al. | |
| 5,774,992 A | 7/1998 | Lindenmuth | |
| 5,792,225 A * | 8/1998 | Yamamoto | 55/385.1 |
| 6,108,912 A | 8/2000 | Radigan | |
| 6,112,736 A | 9/2000 | Bearden | |
| 6,173,499 B1 | 1/2001 | Hegoas et al. | |
| 6,375,557 B1 | 4/2002 | Spangenberg et al. | |
| 6,503,125 B1 | 1/2003 | Harrington | |
| 6,510,772 B2 | 1/2003 | Brickner, Jr. et al. | |

(Continued)

FOREIGN PATENT DOCUMENTS

DE    G 79 30 130.7    12/1984

(Continued)

*Primary Examiner*—Jason M Greene
*Assistant Examiner*—Minh-Chau T Pham
(74) *Attorney, Agent, or Firm*—Michael Aronoff; Adan Ayala

(57) ABSTRACT

An improved dust collector for a power tool is employed. The dust collector includes a body portion, a neck portion and a head portion, wherein the body portion is disposable on the power tool so that during the cutting operation the body portion will receive and direct the air, dust, and debris to the head portion via the neck portion to either be exhausted out or to be collected in a dust collection volume. Preferably, the body portion has a series of openings to allow the user to view the cutting wheel during the cutting operation. The body portion may also have an internal directional member for efficiently directing the flow of air, dust, and debris. The head portion is preferably rotatably connected to the neck portion to allow the user to rotate the head portion to a desired position.

18 Claims, 4 Drawing Sheets

U.S. PATENT DOCUMENTS

| | | | |
|---|---|---|---|
| 6,543,142 B2 | 4/2003 | Bruce et al. | |
| 6,557,261 B1 | 5/2003 | Buser et al. | |
| 6,935,939 B1 * | 8/2005 | Buser et al. | 451/451 |
| 7,118,609 B2 * | 10/2006 | Valentini | 55/385.1 |
| 7,225,803 B2 * | 6/2007 | Boyadjieff | 125/13.01 |
| 2002/0152731 A1 * | 10/2002 | Reich et al. | 55/385.1 |
| 2006/0107633 A1 * | 5/2006 | Walker | 55/385.1 |

FOREIGN PATENT DOCUMENTS

| | | |
|---|---|---|
| DE | 44 07 081 | 9/1994 |
| DE | 196 09 120 | 9/1996 |
| DE | 197 31 436.8 | 1/1998 |
| DE | 101 31 266.0 | 1/2003 |
| EP | 0 676 263 | 10/1995 |

* cited by examiner

DUST COLLECTOR FOR A POWER TOOL

FIELD OF THE INVENTION

The present invention generally relates to dust collectors for power tools and more particularly, relates to a removable dust collector for a power tool.

BACKGROUND AND SUMMARY OF THE INVENTION

When cutting material using a power tool, such as a cut-off saw, it may be desirable to provide a means to collect and/or exhaust the resulting dust and debris. Many prior art solutions do not properly collect dust and debris for a variety of reasons, including positioning and efficiency. The present application describes an improved dust collector for a power tool.

Further areas of applicability of the present invention will become apparent from the detailed description provided hereinafter. It should be understood that the detailed description and specific examples, while indicating the preferred embodiment of the invention, are intended for the purposes of illustration only and are not intended to limit the scope of the invention.

BRIEF DESCRIPTION OF THE DRAWINGS

The present invention will become more fully understood from the detailed description and the accompanying drawings wherein.

DETAILED DESCRIPTION OF THE PREFERRED EMBODIMENTS

Figure 1:
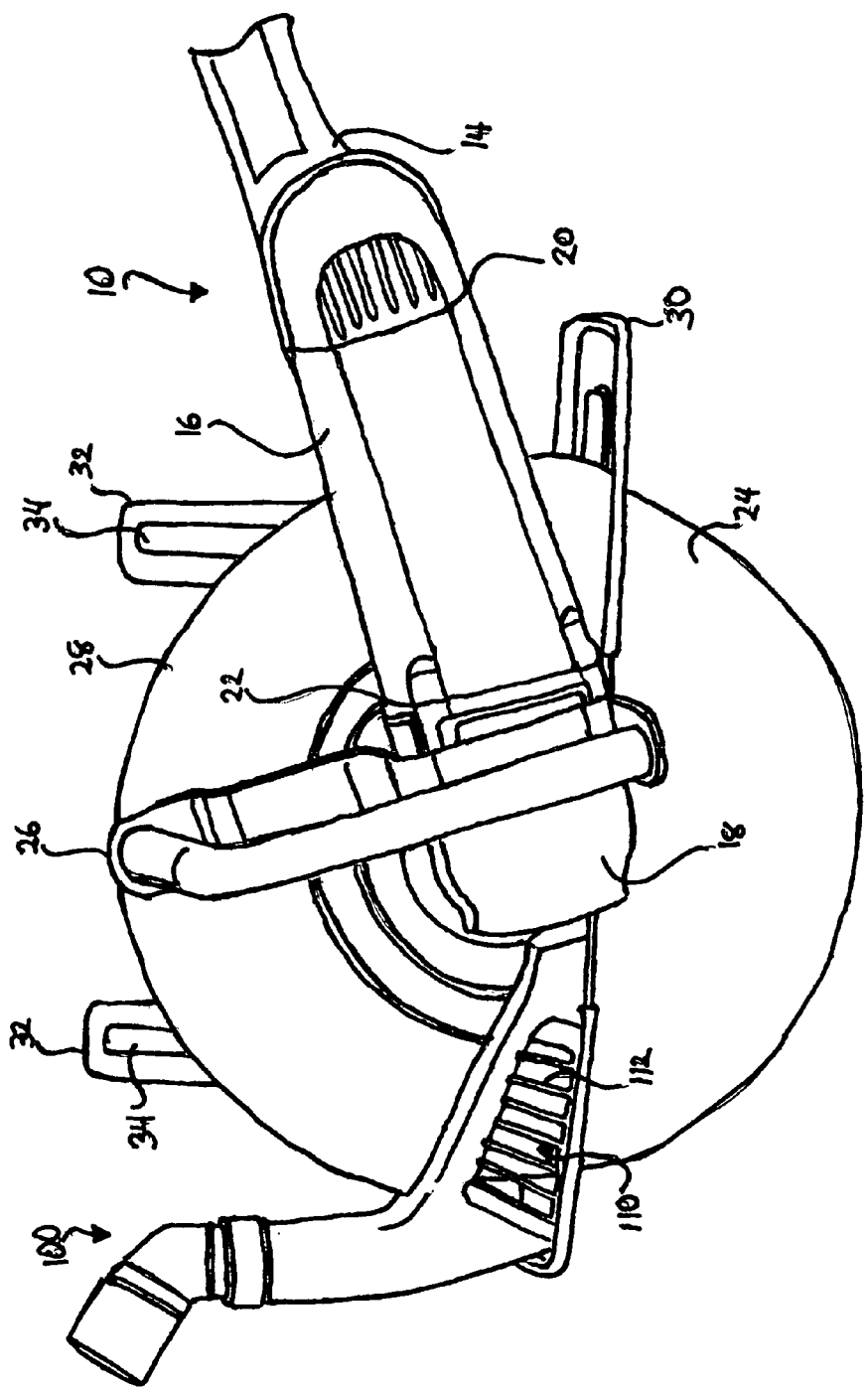
FIG. 1 is a side perspective view of a cut off saw with a dust collector according to the principles of the present invention.
Figure 2:
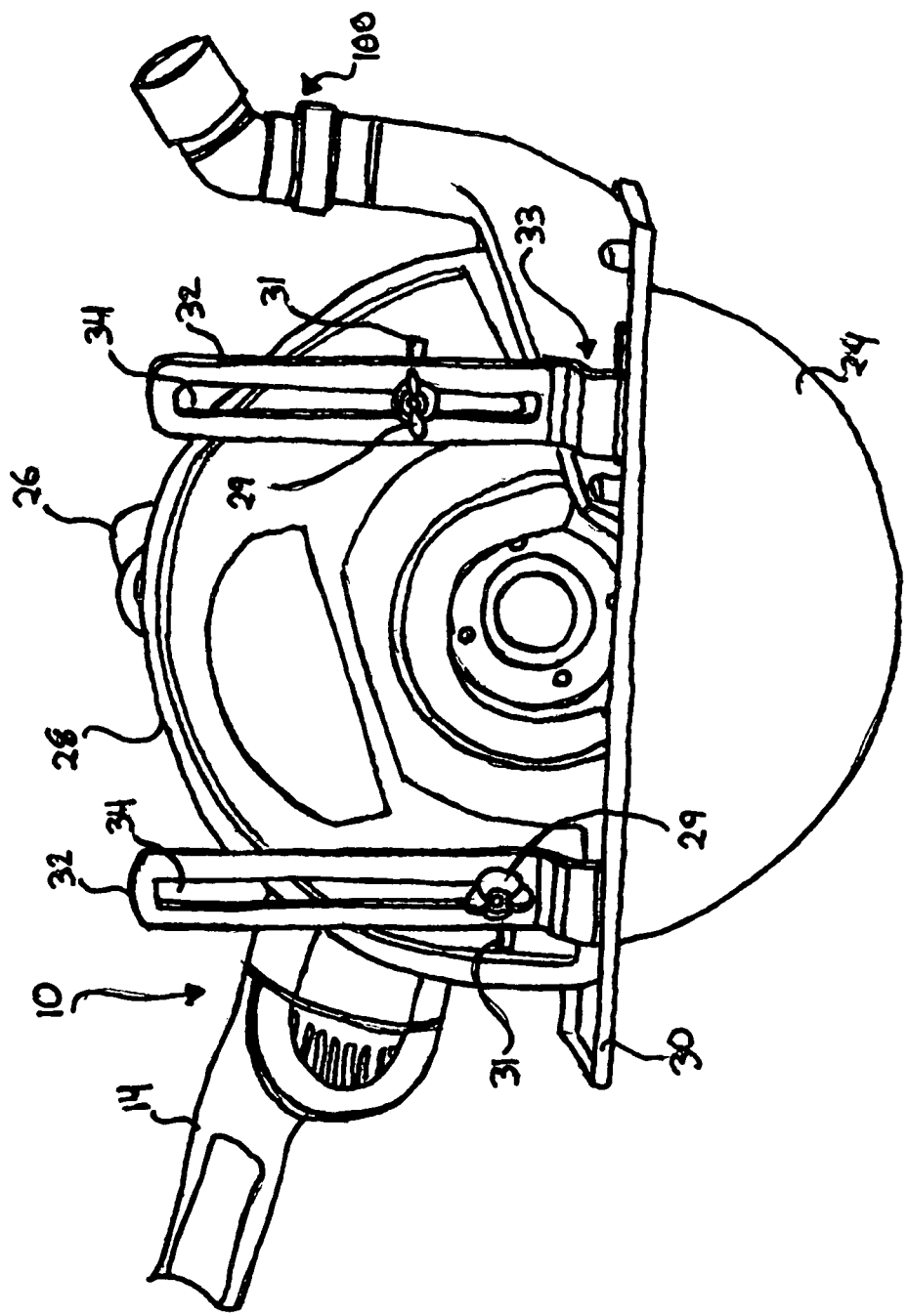
FIG. 2 is a side perspective view of the cut off saw and dust collector.

The invention is now described with reference to the accompanying figures, wherein like numerals designate like parts. Referring to FIGS. 1 and 2, a dust collector apparatus 100 of the present invention is disposed on a cut off saw for illustrative purposes. Persons skilled in the art however will recognize that the dust collector apparatus of the present invention may be disposed on and/or connected to any power tool, such as a circular saw, a chop saw, a radial arm saw, a table saw, a jigsaw, a scroll saw, a drill press, a router, etc.

Referring primarily to FIGS. 1 and 2, the cut off saw 10 preferably includes a housing 12 having a first handle portion 14, a field case 16, and a gear case 18. The first handle portion 14 is preferably fixedly attached to a first end 20 of the field case 16 and the gear case 18 is preferably fixedly attached to a second end 22 of the field case 16. The handle portion 14 preferably supports a switch (not shown) and associated components for selective actuation of the cut off saw 10. The field case 16 preferably supports a motor having a motor spindle that extends into the gear case 18 for driving a gearset supported therein. A wheel spindle preferably extends from gear case 18 and is driven by the motor spindle through the gearset. A cutting wheel 24 is preferably selectively attachable to the wheel spindle and is rotatably driven thereby.

In a preferred embodiment, removeably attached to the gear case 18 via a fixation member, such as a bolt or screw, is a second handle portion 26. The second handle portion 26 may be used as a primary or secondary means for gripping and supporting the power tool during use. Also removeably attached to the gear case 18 via a clamping member (not shown) is a cutting wheel cover 28. In a preferred embodiment, the cutting wheel cover 28 covers at least a portion of the cutting wheel 24 during operation of the tool, and preferably covers the portion of the cutting wheel 24 that is not directly adjacent to the material that will be cut during the cutting operation.

As is conventional in this type of equipment, a shoe, indicated by reference numeral 30, is adjustably attached to the cutting wheel cover 28. The shoe 30 is used as a support against which the material to be cut may be positioned when performing the cutting operation. In a preferred embodiment, the shoe 30 has a central aperture 35 from which the cutting wheel 24 extends and may have at least one, but preferably two, leg members 32 each having an elongate slot 34. The leg members 32 and slots 34 may be used to adjustably attach the shoe 30 to the cutting wheel cover 28 through the use of conventional fastening members 29 such as bolts, wing-nut screws, screws, etc. As can be seen in FIG. 2, the cutting wheel cover 28 preferably includes corresponding slots 31 to receive the fastening members 29. In a preferred embodiment, the leg members 32 may also include a numerical scale along the length of the slots 34 to assist the user in determining the depth of the cutting operation performed on the desired material and the location of the shoe 30 relative to the cutting wheel cover 28.

With particular reference to FIG. 2, in a preferred embodiment, the portion of the leg members 32 adjacent the shoe 30, designated generally by numeral 31, may be bent in an outward, substantially "L-shape." This bending of the leg members 32 provides better clearance for the dust collector apparatus 100 when the dust collector apparatus 100 is disposed on the shoe 30.

Figure 3:
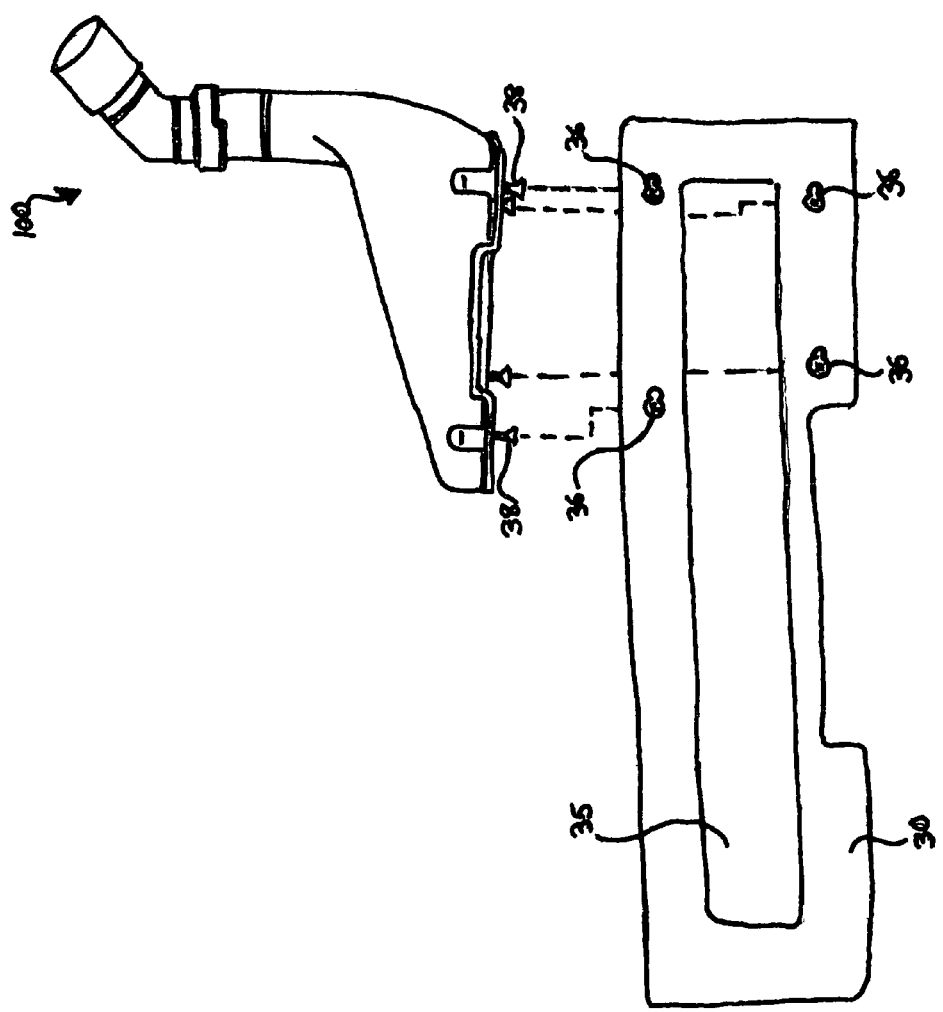
FIG. 3 is a bottom perspective view of the shoe of the cut off saw and dust collector.

Referring to FIGS. 1-3, the dust collector apparatus 100 may be removeably attached to the lateral end of the shoe 30. In a preferred embodiment, when the dust collector apparatus 100 is attached to the shoe 30, it attaches in such a manner as to sit flush against an end of the cutting wheel cover 28 and fit within the outward L-shape curvature of the leg members 32. In an alternative preferred embodiment, the dust collector apparatus 100 may be integrally formed with the shoe 30 and/or the leg members 32.

FIG. 3 illustrates a preferred means of removeably attaching the dust collector apparatus 100 to the shoe 30. In a preferred embodiment, the dust collector apparatus 100 has at least one, but preferably four, fastening members 38 and the shoe 30 has at least one, but preferably four, fastening apertures 36. In a preferred embodiment, the fastening members 38 are flat-head screws but any similar type of fastening member may be used, such as a nail, bolt, screw, etc. and the fastening apertures 36 are preferably formed in a substantially "key-hole" type shape where the apertures 36 comprise a first, larger diameter substantially annular opening connected to a second, smaller diameter substantially annular opening. The dust collector apparatus 100 is removeably attached to the shoe 30 by locking the fastening members 38 within the apertures 36 as explained below.

Preferably, the dust collector apparatus 100 is removeably attached to the shoe 30 by passing the head of each of the fastening members 38 through the first, larger opening of each of the aperture 36 and laterally sliding the fastening member 38 towards and into the second, smaller openings of the apertures 36. In a preferred embodiment, the second, smaller openings are smaller than the heads of the fastening members 38, thus, once the fastening members 38 are laterally moved into the second, smaller openings, the fastening members 38 are locked in place thereby locking the dust collector apparatus 100 to the shoe 30. To remove the dust collector apparatus 100 from the shoe 30, each of the fastening members 38 are laterally moved from the second, smaller openings into the first, larger opening of each of the aperture 36. In a preferred embodiment, the first, larger openings of the apertures 36 are larger than the heads of the fastening members 38, thus, the fastening members 38 easily separate from the apertures 36 in the shoe 30.

Figure 4:
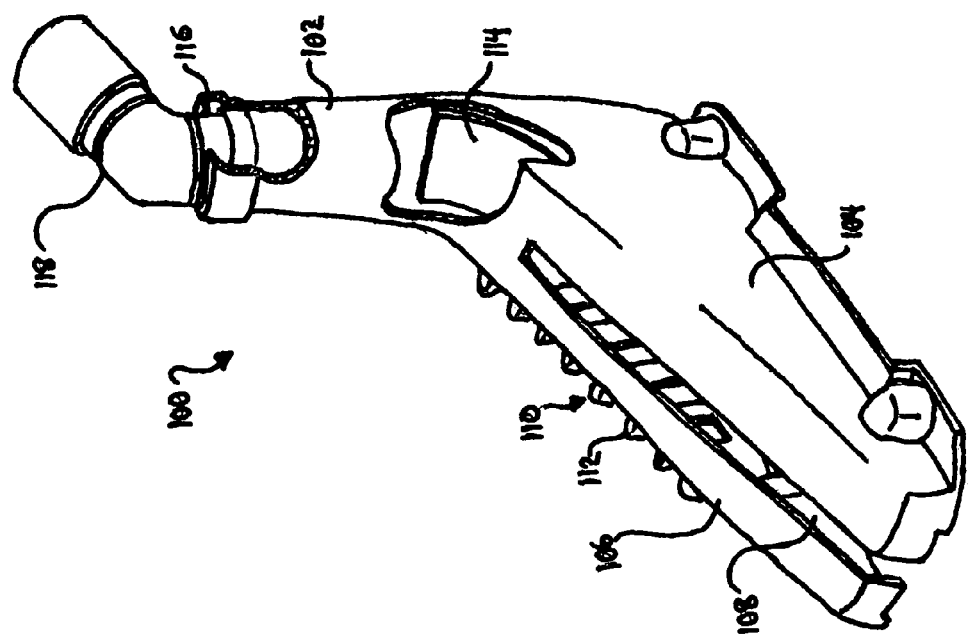
FIG. 4 is a perspective partial cross-sectional view of the dust collector.

Referring now to FIG. 4, a partial cross-section of the dust collector apparatus 100 can be seen. In a preferred embodiment, the dust collector apparatus 100 has a neck portion 102 and a body portion 104. The body portion 104 preferably includes a substantially flat portion 106 against which the cutting wheel cover 28 rests against and a slot 108 from which the cutting wheel 24 extends through.

Turning to FIGS. 1 and 4, the body portion 104 also preferably includes a series of openings 110. The openings 110 allow the user to look into the dust collector apparatus 100 and through the shoe 30 to ensure that the cutting wheel 24 is aligned and cutting along a desired cutting path. Ribs 112 may also be provided between the openings 110 to increase the rigidity of the dust collector apparatus 100.

Referring back to FIG. 4, in a preferred embodiment, located within the body portion 104 is a directional member 114. The directional member 114 is a substantially curved ramp member that serves as a guide to efficiently direct the flow of air, dust, and/or debris from the cutting area through the body portion 104 towards the neck portion 102 of the dust collector apparatus 100 to either be exhausted out or to be collected into a dust collection volume.

The neck portion 102 of the dust collector apparatus 100 extends away from the body portion 104 and preferably ends in a shoulder portion 116. Rotatably attached to the neck portion 102 of the dust collector apparatus 100 is an angled head portion 118. The head portion 118 is rotatably attached to the neck portion 102 through a well-known connection, such as a "tongue and groove" connection, at the shoulder portion 116. In a preferred embodiment, the head portion 118 may have a tongue while the shoulder portion 116 may have a groove. However, in an alternate preferred embodiment, the head portion 118 may have the groove and the shoulder portion 116 may have the tongue. As is evident to one skilled in the art, other means of interconnection may also be employed provided that these means of interconnection allow at least a partial rotatable attachment of the head portion 118 to the neck portion 102 of the dust collector apparatus. In a preferred embodiment, the shoulder portion 116 or the head portion 118 may also include a blocking member to limit the degree of rotation of the head portion 118 with respect to the neck portion 102. For example, instead of a full 360° rotational movement, the rotational movement may be limited to a lesser degree of rotation, such as 270°.

In a preferred embodiment, the head portion 118 may serve as an exhaust or serve as a conduit to a dust collection volume. As an exhaust, since the head portion 118 is rotatably attached to the neck portion 102, the user can rotate the head portion to a desired position that will angle the exhausted air, dust and, debris from the cutting site away from the user. As a conduit to a dust collection volume, the head portion 108 may be connected to a hose that is connected to a dust collection volume, such as a vacuum (not shown).

In a preferred embodiment, the dust collector apparatus 100 is formed from a plastic material. However, the dust collector apparatus may be formed from alternate materials such as metal.

The description of the invention is merely exemplary in nature and, thus, variations that do not depart from the spirit of the invention are intended to be within the scope of the invention. Such variations are not to be regarded as a departure from the spirit and scope of the invention.

What is claimed is:

1. A power tool comprising:
   a housing having a handle portion and a field case;
   a gear case connected to the field case;
   a cutting wheel cover connected to the gear case;
   a shoe assembly having a central aperture connected to the cutting wheel cover, and a dust collector assembly disposed over a portion of the central aperture on a lateral end of the shoe assembly adjacent to the cutting wheel cover,
   wherein the dust collector assembly includes at least one opening to allow a user to look into the dust collector assembly and through the central aperture of the shoe assembly to ensure that the cutting operation is proceeding along a desired cutting path.

2. The power tool of claim 1, wherein the dust collector assembly includes a body portion, a neck portion, and an angled head portion, the head portion rotatable with respect to the neck portion and body portion allowing a user to orient the head portion in a desired position.

3. The power tool of claim 2, wherein the head portion is rotatably connected to the neck portion via a tongue and groove connection.

4. The power tool of claim 2, wherein the neck portion or head portion includes a blocking member to limit the rotation of the head portion with respect to the neck portion and body portion.

5. The power tool of claim 1, wherein the body portion includes a directional member for directing the flow air, dust, and debris.

6. The power tool of claim 1, wherein the shoe assembly includes at least one leg member having an elongated slot and at least one fastening aperture.

7. The power tool of claim 6, wherein the at least one leg member has a substantially perpendicular outward bend to provide clearance for the dust collector assembly disposed on the shoe assembly.

8. The power tool of claim 6, wherein the at least one fastening aperture has two connected substantially annular openings with differing diameters.

9. The power tool of claim 8, wherein the dust collector apparatus has at least one fastening member having a head member, the head member of the fastening member configured and dimensioned to engage the aperture.

10. A power tool comprising:
    a housing having a handle portion and a field case;
    a gear case connected to the field case;
    a cutting wheel cover connected to the gear case;
    a shoe assembly having a central aperture connected to the cutting wheel cover, and a dust collector assembly disposed on a lateral end of the shoe assembly adjacent to the cutting wheel cover,
    wherein the dust collector assembly includes a body portion, a neck portion, and an angled head portion, the head portion rotatable with respect to the neck portion and body portion allowing a user to orient the head portion in a desired position.

11. The power tool of claim 10, wherein the dust collector assembly includes at least one opening to allow a user to look into the dust collector assembly and through the central aperture of the shoe assembly to ensure that the cutting operation is proceeding along a desired cutting path.

12. The power tool of claim 10, wherein the head portion is rotatably connected to the neck portion via a tongue and groove connection.

13. The power tool of claim 10, wherein the neck portion or head portion includes a blocking member to limit the rotation of the head portion with respect to the neck portion and body portion.

14. The power tool of claim 10, wherein the body portion includes a directional member for directing the flow air, dust, and debris.

15. The power tool of claim 10, wherein the shoe assembly includes at least one leg member having an elongated slot and at least one fastening aperture.

16. The power tool of claim 15, wherein the at least one leg member has a substantially perpendicular outward bend to provide clearance for the dust collector assembly disposed on the shoe assembly.

17. The power tool of claim 15, wherein the at least one fastening aperture has two connected substantially annular openings with differing diameters.

18. The power tool of claim 17, wherein the dust collector apparatus has at least one fastening member having a head member, the head member of the fastening member configured and dimensioned to engage the aperture.

* * * * *